United States Patent
Marcarian et al.

(10) Patent No.: US 6,590,052 B2
(45) Date of Patent: Jul. 8, 2003

(54) PROCESS FOR CONTINUOUS POLYMERIZATION WITH MICROMIXING OF REACTIVE FLUIDS

(75) Inventors: Xavier Marcarian, Jurancon (FR); Christophe Navarro, Bidache (FR); Laurent Falk, Bioncourt (FR); Fernand Pla, Villers les Nancy (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/911,708

(22) Filed: Jul. 25, 2001

(65) Prior Publication Data

US 2002/0128416 A1 Sep. 12, 2002

Related U.S. Application Data

(63) Continuation of application No. 09/181,079, filed on Oct. 27, 1998, now abandoned.

(30) Foreign Application Priority Data

Oct. 28, 1997 (FR) .......................... 97/13.502

(51) Int. Cl.$^7$ .............................. C08F 20/06; C08F 4/46; B05B 12/00; B63H 25/46
(52) U.S. Cl. ................. 526/317.1; 526/173; 526/318; 526/318.4; 526/319; 526/329.7; 239/265.25; 239/265.23
(58) Field of Search ................. 526/173, 317.1, 526/318, 318.4, 319, 329.7; 239/265.25, 265.23

(56) References Cited

U.S. PATENT DOCUMENTS

| | | | |
|---|---|---|---|
| 3,830,638 A | 8/1974 | Jumentier et al. | 65/14 |
| 4,086,996 A | 5/1978 | Gatewood | 366/154 |
| 4,095,748 A | 6/1978 | Ohtake et al. | 239/419.3 |
| 4,488,407 A | 12/1984 | Delano | 62/74 |
| 5,256,352 A | 10/1993 | Snyder et al. | |
| 5,886,112 A | * 3/1999 | Vuillemin et al. | 526/64 |

FOREIGN PATENT DOCUMENTS

| | | |
|---|---|---|
| DE | 2630132 | 1/1977 |
| EP | 0749987 | 12/1996 |
| FR | 2315982 | 1/1977 |
| FR | 2603209 | 3/1988 |
| GB | 1475771 | 6/1977 |
| JP | 57194033 | 11/1982 |
| JP | 5-132503 | 5/1993 |
| JP | 05-132503 | * 5/1993 |
| JP | 08208747 A | 8/1996 |

OTHER PUBLICATIONS

Yamaguchi et al., Die Angewandte Makromolekulare Chemie, 85, 197–199 (1980).*
Yamaguchi et al. Die Angerwwandte Makromolekulare Chemie, 85, 197–199.
Lee et al. Polymer Engineering and Science, 20, 868–874, 1980.
FR 2603209 –English Abstract.
DE 2630132 –English Abstract.
FR 2315982 –English Abstract.
GB 1475771 –English Abstract.

* cited by examiner

Primary Examiner—Ling-Siu Choi
(74) Attorney, Agent, or Firm—Millen, White, Zelano & Branigan, P.C.

(57) ABSTRACT

The process for the continuous preparation of homopolymers or copolymers by free-impinging-jet micromixing of fluids formed (1) of monomer(s) and (2) of an initiator system consists in micromixing the said fluids (1) and (2) and in recovering the mixture of these fluids in the form of a resultant jet Jr, originating from the point of impingement (I).

27 Claims, 3 Drawing Sheets

PROCESS FOR CONTINUOUS POLYMERIZATION WITH MICROMIXING OF REACTIVE FLUIDS

This application is a continuation of patent application Ser. No. 09/181,079 filed Oct. 27, 1998, abandoned.

BACKGROUND OF THE INVENTION

1. Field of the Invention

The present invention relates to a process and a device for the continuous micromixing of fluids, leading to the polymerization of monomer(s) and to the obtainment of homopolymers or copolymers.

2. Background Information

Good continuous micromixing of fluids is desired in the case of certain very rapid reactions, as well as in the case where it is desired to rapidly homogenize two or more miscible or immiscible fluids.

The process and the device according to the invention can be used in particular when the micromixing plays an important role, for example, in the yield and characteristics of the products. This is the case, in particular, for crystallization, precipitation and combustion reactions and for polymerization and copolymerization reactions.

The invention is particularly useful for ultra-fast (co)polymerizations leading to (co)polymers of controlled mass and polydispersity and, preferably, with a high solids content; this is the case, in particular, for the anionic polymerization of (meth)acrylic monomers.

The mixing of two or more fluids in a very short space of time may be necessary in certain circumstances and in particular when these fluids are reactive with each other and when the chemical reaction kinetics are complex and/or rapid. It is thus convenient, in certain cases, to mix the reactants at the molecular level (micromixing) in a time shorter than the characteristic reaction time.

To characterize the micromixing, parallel-concurrent or consecutive-concurrent type reactions can be used as test reactions.

This is the case, for example, for parallel-concurrent reactions of the type:

$$A+B \rightarrow R \qquad (1)$$

$$C+B \rightarrow S \qquad (2)$$

or consecutive-concurrent reactions of the type:

$$A+B \rightarrow R \qquad (1')$$

$$B+R \rightarrow S \qquad (2')$$

in which A, B and C are reactants and R and S are products.

In the parallel-concurrent reaction system, B is mixed, in stoichiometric deficit, with a mixture containing A and C. In the consecutive-concurrent reaction system, B is mixed, in stoichiometric deficit, with A. In general, R is the desired product and S is a side product. In both cases, the reaction rates (1) and (1') are greater than those for the reactions (2) and (2') respectively.

The proportion of R and S depends on the quality of the micromixing between A and B:

if the micromixing is good, i.e. if the characteristic micromixing time is less than the characteristic time for the reaction (2) or (2'), depending on the case, essentially only R will be formed;

on the contrary, if the micromixing is poor, i.e. if the characteristic micromixing time is greater than the characteristic time for the reaction (2) or (2'), depending on the case, S will also be formed. The amount of S formed thus depends both on the micromixing (the poorer the micromixing, the more S will be formed) and on the stoichiometry of the reactions.

In general, if S is an undesirable side product, it will be advantageous to promote good micromixing in order to increase the yield of R and, in this way, to reduce the costs of separation between R and S and to avoid the formation of a side product S which cannot be viably upgraded.

In the case of living polymerization reactions, i.e. a polymerization, in particular one which is free or virtually free of termination and/or transfer reactions, micromixing makes it possible to control the molar mass distribution. The reason for this is that one of the particular features of this type of polymerization lies in the fact that it is possible to obtain very narrow molar mass distributions, i.e. all of the macromolecular chains contain virtually the same number of monomer units. However, this condition is satisfied only if, on the one hand, the initiation reaction takes place rapidly before the propagation reactions have begun, and, on the other hand, the chains grow simultaneously. Initiation systems allow the first condition of rapid initiation to be satisfied. On the other hand, only good micromixing between the initiator and the monomer will allow the simultaneous growth of the macromolecular chains. If the micromixing is not good, some chains will start to grow before others, which, in the end, will result in broadening of the molar mass distribution.

Currently, one of the techniques most commonly used for mixing two or more liquids consists in using a closed, semi-closed or open tank, fitted with a mechanical stirrer such as a propeller or turbomixer or the like, and in injecting one or more of the reactants into the tank.

The mixing can be carried out by virtue of the energy dissipated by the mechanical stirring. Unfortunately, these devices do not make it possible, in certain cases, to achieve micromixing times that are short enough to carry out rapid and complex reactions, and above all, they are unsuitable in the case of polymerization reactions in which the viscosity increases rapidly over time.

Static mixers, placed in line in a conduit or at a reactor inlet, allow good mixing of liquids. However, they are usually used as premixers before the reactor inlet or when the time constraints are not prohibitive. They are good devices for homogenizing solutions, but are not really suitable for certain polymerization reactions, in particular rapid reactions, since there are considerable risks of blockage. This is the case, in particular, for polymerizations at a high solids content.

Tangential-jet mixers (which can be used in particular for anionic polymerization as described in EP-A-0,749,987) or RIM (reaction injection moulding) heads are confined-jet mixers, i.e. mixers involving jets which are in contact with the wall of the mixer. They are highly effective, but result in blockages when high polymer contents are used or require the injection of products by pumps which can withstand high pressures (several hundred bar). Furthermore, RIM heads require a batchwise operation.

Free-impinging-jet mixing (i.e. mixing without jets coming into contact with the walls of the mixer) is known, and has been described for creating emulsions or in liquid-liquid extraction processes, for example by Abraham Tamir, "Impinging-Stream-Reactors. Fundamentals and Applications", Chap. 12: Liquid-Liquid Processes, Elsevier (1994).

Free-impinging-jet devices have also been described for precipitation or polymerization. They consist of two jets oriented at a given angle and whose impingement results in a rapid micromixing; cf. Amarjit J. Mahajan and Donald J. Kirwan "Micromixing Effects in a Two Impinging-Jets Precipitator, Aiche Journal, Vol. 42, No. 7, pages 1801–1814 (July 1996); Tadashi Yamaguchi, Masayuki Nozawa, Narito Ishiga and Akihiko Egastira "A Novel Polymerization Process by Means of Impinging Jets", Die Angewandte Makromolekulare Chemie 85 (1980) 197–199 (No. 1311). The drawback of these systems is that they only allow two fluids to be mixed and that the jets are all of the same diameter and, consequently, if it is desired for the mixing to be efficient, the respective flow rates in each jet must all be equal to each other. In the case of a polymerization reaction, since the monomer arrives in a first jet and the initiator solution arrives in a second jet at the same flow rate as the first, it is thus seen that the amount of solvent in the system will necessarily be relatively large, which means having to involve recycling operations, that are generally expensive, downstream of the polymerization process.

The subject of the present invention is thus a polymerization process comprising continuous free-impinging-jet micromixing, which no longer incurs the limitations which have just been described, as well as a device for carrying out this process.

SUMMARY OF THE INVENTION

The process according to the invention, for the continuous preparation of homopolymers or copolymers by free-impinging-jet micromixing of fluids formed (1) of monomer (s) and (2) of an initiator system, is characterized in that the said fluids (1) and (2) are micromixed and the mixture of these fluids is recovered in the form of a resultant jet Jr, originating from the point of impingement (I), the micromixing being obtained by:

a) forming at least one group of at least two jets Ja of the said identical or different fluids, these jets coinciding at a point of impingement (I), the jets Ja of the same group all being of identical geometry, their axes being arranged such that their projections on a plane perpendicular to the axis (A) of the resultant jet Jr are distributed angularly in a uniform manner and these axes being inclined relative to the said axis (A) by the same non-zero angle $\alpha$ of not more than 90°;

b) simultaneously directing at the point of impingement (I) at least one jet Jb of a fluid which is different from at least one of the fluids of the said jets Ja for forming the resultant jet Jr, the axis of the jet(s) Jb being inclined relative to the axis of the resultant jet Jr by an angle $\beta$ which is less than the angle $\alpha$; and c) recovering the mixture of the fluids in the jets Ja and Jb in the form of the resultant jet Jr consisting of the homopolymers or copolymers.

The jets Ja and Jb are preferably arranged such that the resultant jet Jr, obtained from the point of impingement (I), has a vertical direction directed downwards.

The term "geometry" is understood to refer to the shape of the jets Ja and Jb, which can be in cylindrical, conical, sheet, etc. shape. Preferably, the jets are cylindrical and have a cross-sectional diameter of, for example, between 0.01 mm and 100 mm, and preferably between 0.1 mm and 10 mm. The jets Ja and Jb can have the same geometrical shape.

The term point of impingement is understood to refer to the initial zone of contact between all of the jets.

The angle $\alpha$ is preferably from 10 to 60°; the angle $\beta$ is from 0 to 89°. The angle $\beta$ is preferably 0°. The direction of the single jet Jb then joins together with that of the resultant jet Jr.

DETAILED DESCRIPTION

Figure 1:
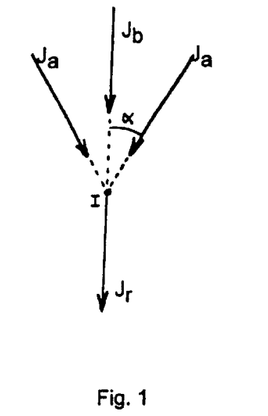
FIG. 1 is a schematic view showing two jets of fluid impinging to form a resultant jet of fluid.

According to one embodiment, represented diagrammatically in FIG. 1, a group of two jets Ja and a jet Jb are formed, these jets coinciding at a point of impingement (I) to form the resultant jet Jr. The axis of the jet Jb corresponds to the axis (A) of the resultant jet Jr which serves as the axis of symmetry for the jets Ja. Needless to say, the group can comprise more than two jets Ja.

Figure 2:
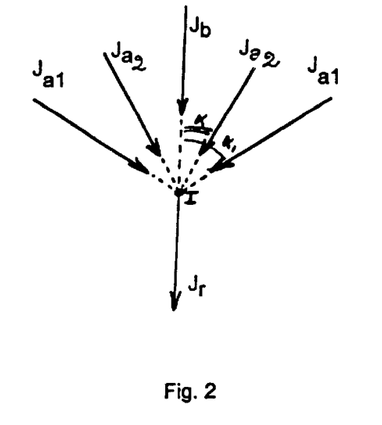
FIG. 2 is a schematic view showing two groups of fluid jets impinging to form a resultant jet.

According to another embodiment, represented diagrammatically in FIG. 2, a first group of jets $Ja_1$, a second group of jets $Ja_2$ and a jet Jb are formed, all the jets coinciding at a point of impingement (I) to form a resultant jet Jr which acts as the axis of symmetry for the jets $Ja_1$ and $Ja_2$ which form, with this axis, angles $\alpha1$ and $\alpha2$ respectively.

According to one embodiment, a group of at least two jets Jb of identical or different fluids is directed at the point of impingement (I), the jets Jb all being of identical geometry, their axes being arranged such that their projections on a plane perpendicular to the axis (A) of the resultant jet Jr are distributed angularly in a uniform manner and these axes being inclined relative to the said axis (A) by the same angle $\beta$.

Figure 3:
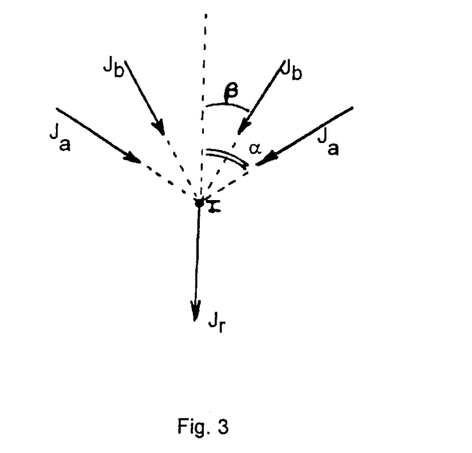
FIG. 3 is a schematic view showing two groups of jets impinging to form a resultant jet with the resultant jet forming an axis of symmetry.

Such an embodiment is represented diagrammatically in FIG. 3, in which a group of two jets Ja and a group of two jets Jb are formed, these jets coinciding at a point of impingement (I) to form the resultant jet Jr, the latter jet serving as the axis of symmetry for the jets Ja and Jb. Needless to say, each group can comprise more than two jets.

Figure 4:
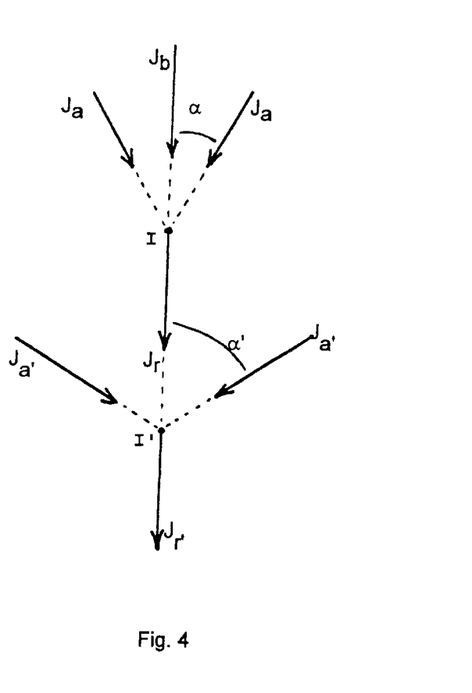
FIG. 4 is a schematic view showing two groups of impinging fluid jets one being downstream of the other.

According to another embodiment, the jet Jr can be used as one of the jets Ja or Jb in order to prepare another micromixture in a step downstream; advantageously, the jet Jr is used as jet Jb in the micromixing downstream, as represented diagrammatically, for example, in FIG. 4.

In all cases, the jets from the same group all have the same geometry and consist of identical or different fluids provided that at least one of the jets Jb is formed of a fluid which is different from one of the fluids in the jets Ja.

In the same group of jets, Ja or Jb, the flow rates of these jets are identical.

The flow rates of the jets Ja and Jb can be identical.

A preferred embodiment is one in which the jet(s) Jb has (have) a different flow rate from that of at least one group of jets Ja.

The flow rate of the fluids in each of the jets Ja and Jb is, for example, from 1 g/h to 10,000 kg/h, in particular from 1 kg/h to 1000 kg/h.

The micromixing process according to the invention can allow reactions other than the polymerization or copolymerization reaction, for example a crystallization, precipitation or combustion reaction.

The fluids are generally liquids. The fluids can be fluids capable of reacting together or can contain components capable of reacting together. If the reaction is rapid, it starts virtually at the point of impingement (I).

The process according to the present invention is advantageously carried out in a chamber equipped for recovery of the resultant jet Jr, it being possible for the said chamber to be temperature- and pressure-adjusted. Thus, the pressure prevailing in the chamber can be from 1 mbar to 3000 bar, in particular from 0.1 to 100 bar, and the temperature can be from −100° C. to 1500° C., in particular from −80° C. to +200° C.

The (co)polymerization resulting from the micromixing of fluids formed of monomer(s) and of an initiator system leads to the formation of homopolymers, random copolymers and block copolymers.

The monomers can be pure or in polar or non-polar solvent medium.

The jets Ja are advantageously jets of monomers which are pure or in solvent medium, and the jet(s) Jb is (are) advantageously jets of initiator system.

In particular, in the case of preparing homopolymers, the jets Ja (for example according to the schemes in FIGS. 1 and 3) consist of monomers, and the jet(s) Jb consist(s) of the initiator system. The polymer is recovered in the resultant jet Jr.

In the case of a random copolymerization (carried out, for example, according to the scheme in FIG. 2), the jets Ja1 are formed of monomer $M_1$ and the jets Ja2 are formed of monomers $M_2$ and the copolymer is recovered in the jet Jr.

Optionally, in order to obtain a random copolymer, a process represented diagrammatically in FIG. 1 or 3 can also be used, in which a jet Ja can comprise a mixture of monomers $M_1$ and $M_2$ or alternatively one of the jets Ja consists of the monomer $M_1$ and the other jet Ja consists of the monomer $M_2$.

In order to prepare block copolymers, a process represented diagrammatically, for example, in FIG. 4 can be used, in which the jets Ja are formed of monomer M and the jet Jb is formed of initiator system. The resultant jet Jr is formed by the living polymer and serves as initiator for the polymerization of the monomer M' in the jets Ja', this polymerization following the micromixing at the point of impingement (I') of the jets Jr and of the jets Ja'; the block copolymer is recovered in the resultant jet Jr'.

In order to obtain block copolymers, a process represented diagrammatically in FIGS. 1 to 3 can also be used, in which the jet(s) Jb consist(s) of an initiator in the form of living polymer.

It is also possible for a jet Ja to consist of monomer(s) and for another jet ja to be formed of the initiator system of the moment, as indicated above, and for all the jets of this group to have the same geometry. In this case, the jet Jb can consist of monomer(s).

The advantage of the process of the invention is that these polymers can be obtained without blocking the reactor, optionally with a high solids content and a reduced amount of solvent.

The monomers which can be (co)polymerized are, in particular, those mentioned in the document EP-A-749,987. They are acrylic, methacrylic, vinyl aromatic, diene and maleimide monomers.

The methacrylic and acrylic monomers are, for example, those which correspond to the following formulae:

in which R is chosen from $C_1$–$C_{18}$ alkyl radicals which are linear or branched, and primary, secondary or tertiary, $C_5$–$C_{18}$ cycloalkyl radicals, $C_1$–$C_{18}$ ($C_1$–$C_{18}$ alkoxy) alkyl radicals, $C_1$–$C_{18}$ ($C_1$–$C_{18}$ alkylthio)alkyl radicals, aryl and arylalkyl radicals, these radicals being optionally substituted with at least one halogen atom and/or at least one hydroxyl group after protection of this hydroxyl group, the above alkyl groups being linear or branched; glycidyl, norbornyl and isobornyl (meth)acrylates and mono- and di($C_1$–$C_{18}$ alkyl)-(meth)acrylamides.

Examples of useful methacrylates which may be mentioned are methyl, ethyl, 2,2,2-trifluoroethyl, n-propyl, isopropyl, n-butyl, sec-butyl, tert-butyl, n-amyl, isoamyl, n-hexyl, 2-ethylhexyl, cyclohexyl, octyl, isooctyl, nonyl, decyl, lauryl, stearyl, phenyl, benzyl, β-hydroxyethyl, isobornyl, hydroxypropyl and hydroxybutyl methacrylates. The preferred methacrylic monomer is methyl methacrylate.

Examples of acrylates of the above formula which may be mentioned are methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

The term "maleimide", as employed above, denotes an unsubstituted maleimide monomer or an N-substituted maleimide monomer of formula:

in which R' is an alkyl, arylalkyl, aryl or alkylaryl radical having from 1 to 12 carbon atoms. Non-limiting examples are: N-ethylmaleimide, N-isopropylmaleimide, N-n-butylmaleimide, N-isobutylmaleimide, N-tert-butylmaleimide, N-n-octylmaleimide, N-cyclohexylmaleimide, N-benzyl-maleimide and N-phenylmaleimide. The preferred maleimide is N-cyclohexylmaleimide.

The term vinylaromatic monomers refers to an aromatic monomer containing ethylenic unsaturation, such as styrene, vinyltoluene, alpha-methylstyrene, 4-methylstyrene, 3-methylstyrene, 4-methoxystyrene, 4-ethylstyrene, 3,4-dimethylstyrene, 3-tert-butylstyrene, 2,4-dichlorostyrene, 2,6-dichlorostyrene, 1-vinylnaphthalene, 2-vinylpyridine and 4-vinylpyridine.

The term diene monomer refers to a diene chosen from linear or cyclic, conjugated or non-conjugated dienes such as, for example, butadiene, isoprene and 1,3-pentadiene.

One particularly advantageous embodiment is anionic polymerization or copolymerization in which one of the monomers is an acrylic or methacrylic monomer such as methyl methacrylate.

The initiator system can be a solution of at least one initiator or a solution of at least one initiator and of at least one additive such as a ligand. In the case of block copolymerization, the initiator can be a living polymer or copolymer, in solvent medium where appropriate, optionally combined with an additive such as a ligand.

As initiator, it is possible to use a monofunctional initiator of general formula (I):

$$R^1—M$$

in which:

M denotes an alkali metal or alkaline-earth metal; and $R^1$ denotes:
- an alkyl radical with a straight or branched chain, containing 2 to 6 carbon atoms; or
- an aryl radical with one or more rings, optionally substituted; or
- a $C_2$–$C_6$ alkenyl radical substituted with aryl or alkylaryl; or
- a linear or branched alkyl radical containing 1 to 6 carbon atoms, substituted with at least one phenyl group, or an anionic monofunctional initiator for (meth)acrylates chosen from α-lithioisobutyrates and amides, or alternatively a difunctional initiator of formula (II):

(II)

in which:

M is as defined above; and $R^2$ represents an aliphatic, cycloaliphatic or aromatic divalent organic radical or an organic radical containing at least one cycloaliphatic or aromatic group, it being possible for $R^2$ to contain substituents, and $R^3$ and $R^4$ each independently represent an aliphatic, cycloaliphatic or aromatic monovalent organic radical or an organic radical containing at least one cycloaliphatic or aromatic group, it being possible for $R^3$ and $R^4$ to contain substituents.

Examples of monofunctional initiators of formula (I) which may be mentioned are sec-butyllithium, n-butyllithium, fluorenyllithium, alpha-methylstyryllithium, 1,1-diphenylhexyllithium (DPHLi), diphenylmethyllithium or -sodium or -potassium and 1,1-diphenyl-3-methylpentyllithium.

Examples of difunctional initiators of formula (II) which may be mentioned are 1,1,4,4-tetra-phenyl-1,4-dilithiobutane and 1,1,4,4-tetraphenyl-1,4-disodiobutane.

It is also possible to use well-known difunctional initiator precursors, such as naphthalene-lithium, naphthalenesodium, naphthalenepotassium and homologues thereof.

Moreover, the initiator as defined above is combined with at least one ligand consisting of an alkali metal alkoxide of formula (III) or (IV):

$$R^5(OR^6)_nOM^1 \quad (III)$$

$$M^1(OR^6)_nOM^1 \quad (IV)$$

in which:

$M^1$ represents an alkali metal;

$R^5$ is a linear or branched alkyl radical having from 1 to 6 carbon atoms or an arylalkyl radical in which the alkyl residue is $C_1$–$C_6$, or an alkylaryl radical in which the alkyl group has from 1 to 6 carbon atoms;

$R^6$ is a linear or branched alkylene radical having from 2 to 4 carbon atoms;

n is the integer 1, 2 or 3.

Examples of such alkoxides which may be mentioned are those in which the radical $R^5$ is a methyl, ethyl, butyl or benzyl radical, $R^5$ advantageously being the methyl radical, and $R^6$ is the ethylene, propylene, butylene or isopropylene radical, $R^6$ preferably being the ethylene radical. $M^1$ is lithium, sodium or potassium and preferably represents lithium.

Specific examples are as follows:

$CH_3(OCH_2CH_2)OLi$ $CH_3(OCH_2CH_2)_2OLi$ $CH_3(OCH_2CH_2)_3OLi$ $nBu(OCH_2CH_2)_2OLi$ $Et(OCH_2CH_2)_2OLi$

$Li(OCH_2CH_2)_2OLi$ $Li(OCH_2CH_2)_3OLi$

The alkoxides of formulae (III) and (IV) are prepared, for example, by reaction of $R^5(OR^6)_nOH$ or $H(OR^6)_nOH$ respectively with any base whose pKa is higher than the pKa of the $R^5(OR^6)_nOM^1/R^5(OR^6)_nOH$ couple or of the $M^1(OR^6)_nOM^1/H(OR^6)_nOH$ couple. Thus, the lithium alkoxides may be prepared by reaction with lithium metal or by reaction with an organometallic lithium compound in a polar or apolar solvent.

The initiating system can also comprise an alcoholate ligand such as those described here above and a monofonctional or a difunctional silylated initiator such as:

a) a monofunctional initiator having the formula:

wherein:

$R^1$, $R^2$, $R^3$ each independently represent a linear or branched alkyl radical, containing 1 to 8 carbon atoms;

$R^4$ represents a linear or branched alkylene radical containing 1 to 8 carbon atoms;

M designates an alkaline metal or alkaline earth metal (valence q is 1 or 2), b) a difunctional initiator having the formula:

wherein:

$R^5$ and $R^6$ each independently represent a linear or branched alkyl radical containing 1 to 8 carbon atoms;

$R^7$ and $R^8$ each independently represent a linear or branched alkylene radical containing 1 to 8 carbon atoms; and In the formulae above, $R^1$, $R^2$, $R^3$, $R^5$ and $R^6$ each preferably represent an alkyl radical with, preferably 1 to 4 carbon atoms and very particularly, a methyl radical; $R^4$, $R^7$ and $R^8$ each preferably represent an alkylene radical with 1 or 2 carbon atoms and particularly the methylene radical, and M and M' each preferably represent lithium. A particularly appropriate initiator is trimethylsilylmethyl-lithium.

The molar ratio of the ligand of formula (III) or (IV) to the initiator in the initiator system as defined above may vary within a very wide range. The amount of ligand (III) or (IV) must be sufficient to allow the formation of a complex with the polymerization active centre and thus to stabilize the latter. The amount of ligand (III) or (IV) depends on the initiator chosen and on the monomers to be (co) polymerized. The ligand (III) or (IV)/initiator molar ratio is generally between 1 and 50. In order to obtain the best results, this ratio is preferably between 1 and 10.

The monomer(s) may be in solution in at least one polar or non-polar solvent chosen from aromatic solvents such as benzene, toluene and ethylbenzene and solvents such as tetrahydrofuran, diglyme, tetraglyme, ortho-terphenyl, biphenyl, decalin, tetralin or dimethylformamide. The initiator and the ligand are in solution in a solvent of the same type.

The monomers are used, for example, pure or dissolved at a concentration of 10 to 90% monomer; the monomers are preferably used pure.

The (co)polymers formed by anionic polymerization in the resultant jet Jr are living, i.e. they can initiate a new polymerization if an amount of monomer is added. In order to obtain (co)polymers from these living (co)polymers, these living polymers can be deactivated by reaction with a source of protons (for example alcohol, water, protic acid).

In order to carry out the micromixing according to the invention, leading in particular to a (co)polymer via an anionic route, the ratio between the overall flow rate by weight of the jets Ja consisting of the monomers and the overall flow rate of the jet Jb or the overall flow rate by weight of the jets Jb (comprising the initiator system) can be from 0.01 to 100, preferably from 1 to 20. This ratio is preferably constant.

The angle of impingement between the axis of the jets of monomers and the axis of the resultant jet Jr is less than 90°, preferably between 10 and 60° and most particularly between 30 and 45°.

The duration of the micromixing is as short as possible and is less than the (co)polymerization time in order to avoid a non-simultaneous propagation of the chains, which would lead to poor control of the polymerization. The duration is generally at least 0.001 s, in particular from 0.005 to 10 s.

The temperature, at the point of impingement (I) is from about −100° C. to +200° C. and preferably from −80° C. to +100° C.

The polymerization preferably takes place under adiabatic conditions.

The present invention also relates to a device for carrying out the polymerization process defined above.

The device according to the invention is used for the continuous free-impinging-jet micromixing of at least two monomer fluids and an initiator system and in recovering the polymer mixture in the form of a resultant jet Jr. It comprises:

a) means for forming at least one group of at least two jets Ja of identical or different fluids, these jets coinciding at a point of impingement (I), the jets of the same group all being of identical geometry, their axes being arranged such that their projections on a plane perpendicular to the axis (A) of the resultant jet Jr are distributed angularly in a uniform manner and these axes being inclined relative to the said axis (A) by the same non-zero angle α of not more than 90°;

b) means for directing at the point of impingement (I) at least one jet Jb of a fluid which is different from at least one of the fluids of the said jets Ja for forming a resultant jet Jr, the axis of the jet(s) Jb being inclined relative to the axis (A) by an angle β which is less than the angle α, and c) means for recovering the mixture of the fluids in the jets Ja and Jb in the form of the resultant jet Jr.

In particular, the device comprises, as means for forming the jets Ja and Jb, nozzles equal in number to the number of jets Ja and Jb, these nozzles being fixed to a nozzle holder and connected, at the inlet, to fluid inlet tubes and being arranged and oriented to allow, at their outlet, the formation of free jets Ja and Jb and their point of impingement (I), and, as means for recovering the mixture, a chamber connected to the nozzle holder. Means are provided to ensure the necessary flow rates of the jets Ja and Jb.

The nozzles are advantageously removable to allow them to be exchanged with nozzles of different geometry. Thus, the nozzles can consist of tubes of variable diameter or whose outlet end is of variable inside diameter, or onto which distribution heads of variable outlet diameter can be fitted.

For polymerization, the device is intended for the micromixing of fluids which are capable of reacting together, and the chamber forms with the nozzle holder a reactor containing means for adjusting the temperature and pressure. The chamber is advantageously cylindrical with a base which is conical, for example, allowing recovery of the jet Jr.

When the jet Jr is used as a jet Jb in a new micromixing operation downstream, this nozzle holder and this chamber are advantageously designed to form a first module, a second nozzle holder being provided on the outlet of the said chamber (the said second nozzle holder containing, instead of the nozzle normally associated with the said jet Jb, an orifice allowing passage of the jet Jr) and a second chamber being connected to the said second nozzle holder to form a second module, it being possible for other modules of the same type to be provided, where appropriate.

It goes without saying that the device of the invention and its constituent elements are made of materials which are compatible with the fluids conveyed.

Figure 5:
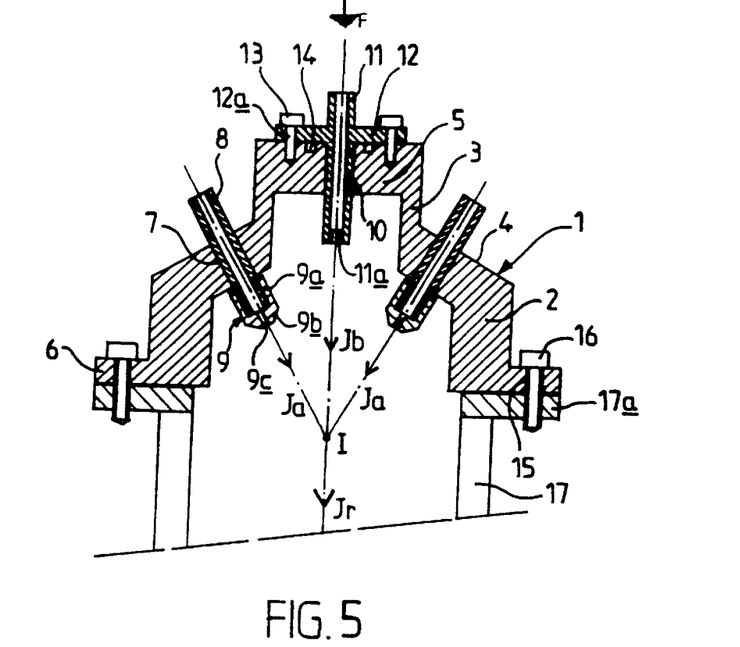
FIG. 5 is an axial cross-section of a micromixer in accordance with a first embodiment of the invention.
Figure 6:
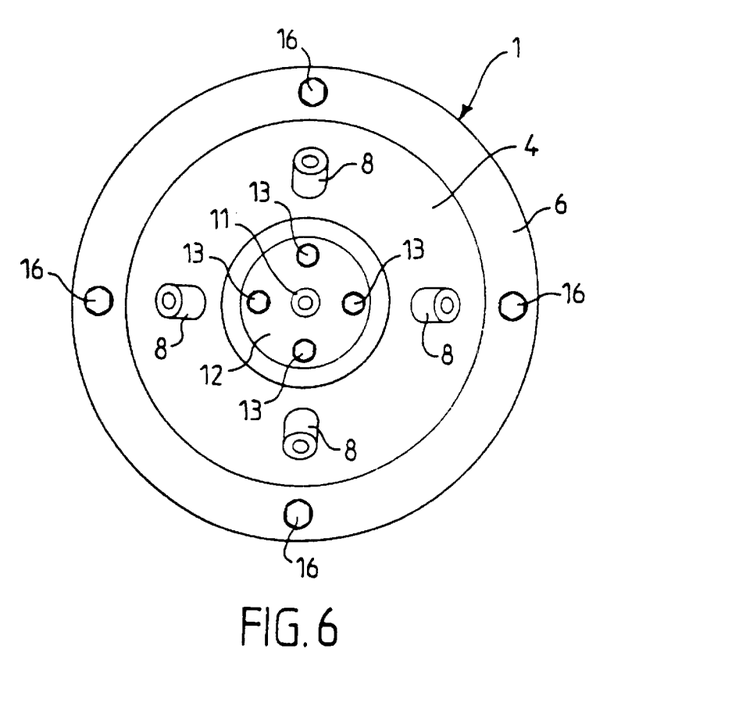
FIG. 6 is a top view, along the arrow F of FIG. 5.

The micromixer represented in FIGS. 5 and 6 comprises a nozzle-holder element (1) which contains a cylindrical wall (2) connected to a cylindrical wall (3), of smaller thickness and smaller diameter, by a frustoconical shoulder (4), the cylindrical wall (3) being, at its end opposite to the shoulder (4), closed by a circular base (5). At its free end opposite to this circular base, the cylindrical wall (2) is folded outwards at a right-angle to form a flange (6).

Four cylindrical orifices (7) are made in the frustoconical shoulder (4), these holes being uniformly spaced and oriented such that their axes intersect at a point located on the axis of the nozzle holder (1), on the inside. In the example represented, the axis of an orifice (7) forms an angle of 30° with the axis of the nozzle holder (1).

A tube (8) is inserted and held, by force-fitting, in each orifice (7) and along the axis thereof, this tube, once mounted, projecting both externally and internally. The external parts serve to connect fluid inlet tubes and the internal parts have, for example, an external thread to receive a distribution head (9).

Each distribution head (9), consisting of a side distribution nozzle with the associated tube (8), contains a cylindrical wall (9a) fitted on the inside with means for fixing to the tube (8), for example a screw thread intended to match up with the thread on the tube (8), the cylindrical wall (9a)

being connected to a base (9b) containing an axial fluid outlet orifice (9c). By providing a set of distribution heads (9) with different orifice diameters (9c), the diameter of the jets of fluid Ja leaving the four side distribution nozzles can be varied.

The circular base (5) contains, at its centre, a cylindrical orifice (10) into which is force-fitted a tube (11) which has, close to one of its ends, a flange (12) which, in the mounting position, bears against the external wall of the base (5). This flange (12) contains four uniformly distributed orifices (12a) which accept screws (13) for fixing the tube (11) to the nozzle holder (1). The base (5) also includes a circular groove (14), centred on the axis of the orifice (10), in the internal space of the holes for accepting the screws (13), this groove (14) receiving a seal (not represented).

In the same way as for the tubes (8), the tube (11), once mounted on the nozzle holder (1) contains an external part, which projects beyond the flange (12), for connecting a fluid inlet tube, and an internal part which projects beyond the base (5) and whose internal wall is of smaller diameter (11a) in its end part. This thus makes an axial distribution nozzle for a jet Jb of fluid, which, in operating mode, will encounter the side jets Ja at the point of impingement (I) to continue as a resultant axial jet Jr.

By providing a set of tubes (11) with different outlet diameters (11a), the diameter of the jet of fluid Jb can be varied. Moreover, it goes without saying that it may, according to a variant, be envisaged to fit onto the internal mouth of the tube (11) a distribution head similar to the distribution heads (9) associated with the side tubes (8). In the same way, to vary the outlet diameter of the side nozzles, sets of tubes (8) having different diameters at the outlet end may be provided.

The flange (6) of the nozzle holder (1) contains four uniformly distributed openings (15) for accepting the screws (16) which fix the nozzle holder (1) onto the upper flange (17a) of a chamber (17) of tubular-general shape, of the same axis as the nozzle-holder element (1).

The resultant axial jet Jr, which flows along the axis of this chamber, is the site of the reaction between the fluids perfectly mixed at the point of impingement (I). The reaction product is then recovered in the base of the chamber (17), which can contain pressurization means and heating or cooling means, as well as means for adjusting the temperature and pressure prevailing in the chamber, depending on the reaction considered.

Figure 7:
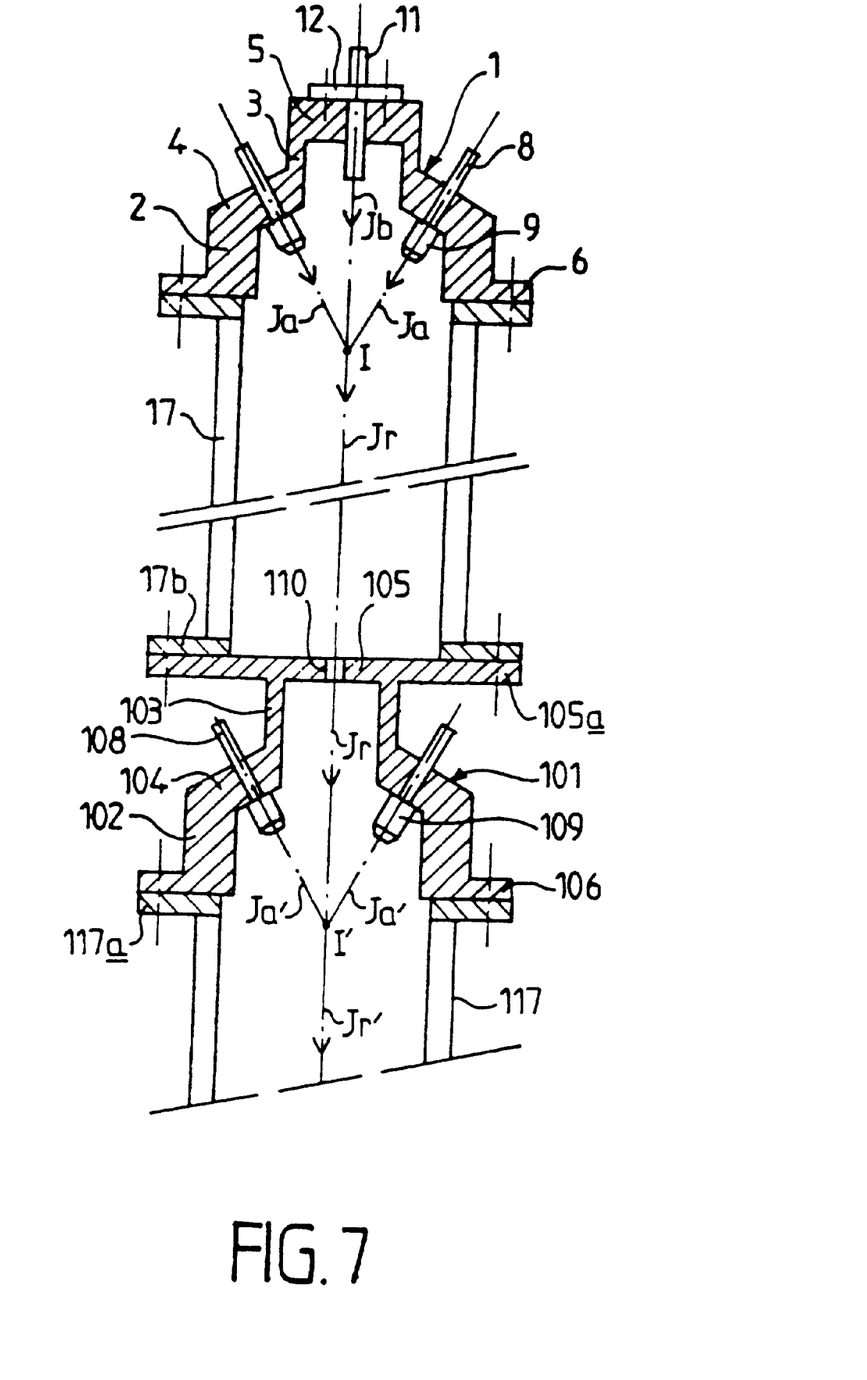
FIG. 7 is an axial cross-section of a micromixer in accordance with a second embodiment of the invention (according to the scheme in FIG. 4).

FIG. 7 is a diagram of an apparatus in accordance with a second embodiment of the present invention, which is more or less identical to that described with reference to FIGS. 5 and 6 (in which the constituent elements, which will not be described again, are denoted by the same reference numbers), the chamber (17) cooperating, at its lower part, with a second nozzle holder (101).

The nozzle (101) is identical to the nozzle holder (1), except that its base (105) does not have a tube (111) and extends laterally as a peripheral circular base plate (105a), which bears a lower flange (17b) of the chamber (17), in order to fix together the nozzle holder (1) and the nozzle holder (101) by means of screws; (the constituent elements of the nozzle holder (101) are denoted with the same reference numbers as those of the nozzle holder (1), to which 100 has been added). In other words, 102 designates a first cylindrical wall connected to a second cylindrical wall 103 by a frustoconical shoulder 104 with the cylindrical wall 103 being closed by a circular base 105. The circular base 105 has a cylindrical orifice 110 therethrough and is connected to the flange 17b by a peripheral portion 105a. A right angle flange 106 connects the nozzle holder element 101 to a flange 117a of the chamber base 117 in which the reaction product is recovered. Tubes 108 connect distribution heads 109 to the sources of fluids.

In this case, in operating mode, the jet Jr passes through the orifice (110) made in the base (105) to mix, at the point of impingement (I') in the chamber (117), with side jets Ja' of a fluid intended to be combined or to react with the product in the jet Jr, the side jets Ja' being formed in the same way as the side jets Ja. The resultant jet Jr' may itself constitute a new axial jet for mixing with new side jets.

The examples which follow illustrate the present invention without, however, limiting the scope thereof. The methyl methacrylate (MMA) used in these examples is purified by standing over molecular sieves and then over alumina; the toluene and the tetrahydrofuran (THF) are purified over molecular sieves.

EXAMPLE 1

Continuous Anionic Polymerization of MMA Using a Free-impinging-jet Micromixer 20 kg of pure MMA are introduced into a 30 l storage tank C1 maintained under inert atmosphere at −21° C.

An initiator solution is prepared in a 30 l storage tank C2 maintained under inert atmosphere at −23° C., by first introducing the purified solvent, i.e. 17.50 kg of a mixture of toluene and tetrahydrofuran in an 88:12 mass ratio, and then adding:

304.40 g (315.40 ml) of 2-methoxyethanol, 2 ml of 1,1-diphenylethylene (DPE) (coloured indicator), and 2.5 l of a 1.6 M solution of butyllithium in hexane in order to prepare the ligand $CH_3$—O—$CH_2CH_2$—OLi by reaction of 4 mol of $CH_3$—O—$CH_2CH_2$—OH with 4 mol of BuLi in the presence of the DPE coloured indicator; and then adding:

173.04 g (169.48 ml) of DPE, and 0.5 l of a 1.6 M solution of BuLi in hexane, in order to prepare the initiator, whose concentration, in the storage tank C2, is $3.39 \times 10^{-2}$ mol/l.

The MMA and the initiator solution contained in the storage tanks C1 and C2 respectively are pumped and passed first through an exchanger which produces a mixture temperature of −25° C., and then into a micromixer of the type described in FIGS. 5 and 6, in which the monomer is introduced at a total flow rate of 81 kg/h as the four side jets Ja (i.e. 20.25 kg/h in each jet); the jets Ja are each inclined at an angle of 45° relative to the vertical and emerge from the distribution head (9) whose diameter is 2 mm; the initiator solution is introduced at a flow rate of 18 kg/h as the vertical axial jet Jb emerging from the distribution head (11), the diameter of which is 1.5 mm.

The distance travelled by the jets Ja between the distribution head outlet (9) and the point of impingement (I) is 30 mm, and the distance travelled by the jet Jb between the tube outlet (11) and the point of impingement (I) is 40 mm.

The tubular chamber (17) associated with the nozzle-holder element (1) forms the polymerization reactor in which the pressure is maintained at 1 bar absolute of nitrogen, and the temperature is maintained at 20° C.

At the point of impingement (I), the MMA concentration is 7.38 mol/l and the initiator concentration is $7.38 \times 10^{-3}$ mol/l. The duration of the micromixing is about 5 ms. Polymerization of the MMA takes place in the resultant jet Jr which travels a distance of 500 mm to the conical base of the chamber (17), where the solution of PMMA, which contains 41% by weight of solids, is recovered.

The PMMA has an $\overline{M}n$ of 65,600 g/mol.

EXAMPLE 2

Continuous Anionic Polymerization of MMA Using a Free-impinging-jet Micromixer 20 kg of pure MMA are introduced into a 30 l storage tank C1 maintained under inert atmosphere at −24° C.

An initiator solution is prepared in a 30 l storage tank C2 maintained under inert atmosphere at −34° C., by first introducing the purified solvent, i.e. 7.90 kg of a mixture of toluene and tetrahydrofuran in an 88:12 mass ratio, and then adding:

253.67 g (262.87 ml) of 2-methoxyethanol, 2 ml of 1,1-diphenylethylene (DPE) (coloured indicator), and 2.083 l of a 1.6 M solution of BuLi in hexane in order to prepare the ligand $CH_3$—O—$CH_2CH_2$—OLi as in Example 1; and then adding:

144.20 g (141.23 ml) of DPE, and 0.42 l of a 1.6 M solution of BuLi in hexane, in order to prepare the initiator, whose concentration, in the storage tank C2, is $5.55 \times 10^{-2}$ mol/l.

The MMA and the initiator solution contained in the storage tanks C1 and C2 respectively are pumped and passed first through an exchanger which produces a mixture temperature of −26° C., and then into a micromixer of the type described in FIGS. 5 and 6, in which the monomer is introduced at a total flow rate of 80 kg/h as the four side jets Ja (i.e. 20 kg/h in each jet); the jets Ja are each inclined at an angle of 30° relative to the vertical and emerge from the distribution head (9) whose diameter is 2 mm; the initiator solution is introduced at a flow rate of 20 kg/h as the vertical axial jet Jb emerging from the distribution head (11), the diameter of which is 1 mm.

The distance travelled by the jets Ja between the distribution head outlet (9) and the point of impingement (I) is 30 mm, and the distance travelled by the jet Jb between the tube outlet (11) and the point of impingement (I) is 40 mm.

The tubular chamber (17) associated with the nozzle-holder element (1) forms the polymerization reactor in which the pressure is maintained at 3.5 bar absolute of nitrogen, and the temperature is maintained at 20° C.

At the point of impingement (I), the MMA concentration is 7.35 mol/l and the initiator concentration is $1.22 \times 10^{-2}$ mol/l. The duration of the micromixing is about 5 ms. Polymerization of the MMA takes place in the resultant jet Jr which travels a distance of about 500 mm to the conical base of the chamber (17), where the solution of PMMA, which contains 51% by weight of solids, is recovered.

The PMMA has an $\overline{M}n$ of 32,600 g/mol.

EXAMPLE 3

Continuous Synthesis of a Polybutadiene-PMMA Block Copolymer

The example shows that a block copolymer can be prepared with the device according to the invention.

The process is generally performed as in Examples 1 and 2, except that the initiator solution-consists of a solution of living polybutadiene and that a micromixing and reaction device is used which is capable of producing:

four side jets Ja of pure MMA emerging from distribution heads (9) 2 mm in diameter, the jets Ja each being inclined at an angle of 45° relative to the vertical, and a vertical axial jet Jb of initiator solution (living polybutadiene) emerging from a distribution head (11) 1.5 mm in diameter.

A batch reactor under inert atmosphere is used to prepare the initiator solution; 12.8 kg of purified toluene are introduced therein and heated to 50° C., followed by addition of 30.2 g of BuLi (1.3 M in hexane) as initiator. Next, 3.2 kg of butadiene are added while monitoring the exothermicity and the variation in pressure; the mixture is cooled to −15° C., followed by addition of a solution of DPE and of alkoxide $CH_3$—O—$CH_2CH_2$—OLi obtained by reacting 27.1 g of 2-methoxyethanol with 222.2 ml of BuLi (1.6 M in hexane) and 25.6 g of DPE and 2.8 kg of toluene. An initiator solution is thus obtained containing living polybutadiene of $\overline{M}n=41,100$ g/mol, which is stored at −20° C. in a 40 l storage tank C2.

A storage tank C1 contains a solution of 21 kg of MMA in 35.9 kg of toluene at −29° C.

A copolymer composition of 60% polybutadiene/40% PMMA by weight is targeted. The solids content envisaged for the copolymer is 9.4%.

The MMA solution and the initiator solution (living polybutadiene) contained in the storage tanks C1 and C2 respectively are pumped and the flows are then injected into the micromixing device whose characteristics were mentioned above, the total flow rate of the MMA solution being 80 kg/h (i.e. 20 kg/h in each jet) and the flow rate of the initiator solution being 32.5 kg/h.

The distance travelled by the jets Ja between the distribution head (9) outlet and the point of impingement (I) is 30 mm and the distance travelled by the jet Jb between the tube outlet (11) and the point of impingement (I) is 40 mm.

The tubular chamber (17) associated with the nozzle-holder element (1) forms the copolymerization reactor in which the pressure is maintained at 1 bar absolute of nitrogen and the temperature is maintained at 20° C.

The copolymerization takes place in the resultant jet Jr which travels a distance of about 500 mm to the base of the chamber (17), where the solution of polybutadiene-PMMA block copolymer, which contains 8.7% by weight of solids, is recovered.

The polybutadiene-PMMA copolymer has an $\overline{M}n$ of 68,700 g/mol. The polybutadiene and PMMA contents, determined by proton NMR, are, respectively, 60% and 40%.

The preceding examples can be repeated with similar success by substituting the generically or specifically described reactants and/or operating conditions of this invention for those used in the preceding examples.

The entire disclosure of all applications, patents and publications, cited above, and of corresponding French application No. 97.13502, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A continuous polymerization process for preparation of homopolymers or copolymers by free-impinging-jet micromixing of fluids formed (1) of monomer(s) and (2) of an initiator system, wherein said fluids (1) and (2) are micromixed and the mixture of these fluids is recovered in the form of a resultant jet Jr, originating from the point of impingement (I), the micromixing being obtained by:

a) forming at least one group of at least two jets Ja delivering monomers, these jets coinciding at a point of impingement (I), the jets Ja of the same group all being of identical geometry, their axes being arranged such that their projections on a plane perpendicular to the axis (A) of the resultant jet Jr are distributed angularly in a uniform manner and these axes inclined relative to the said axis (A) by the same angles α of between 10° and 60°;

b) simultaneously directing at the point of impingement (I) at least one jet Jb delivering an initiator system for forming the resultant jet Jr, the axis of the jet(s) Jb being inclined relative to the axis of the resultant jet Jr by an angle β which is less than the angle α, the resultant jet Jr forming an axis of symmetry for jets Jb, jets Ja, Jb and Jr directing fluid in the same general direction; and c) recovering the mixture of the fluids in the jets Ja and Jb in the form of the resultant jet Jr comprising the homopolymers or copolymers.

2. A process according to claim 1, comprising at least two jets Jb having two identical or different fluids directed towards the point of impingement (I), the jets Jb all being of identical geometry, their axes being arranged such that their projections along a plane perpendicular to the axis (A) of the jet Jr are distributed angularly in a uniform manner and are inclined by the same angle β relative to the said axis (A).

3. A process according to claim 1, wherein the angle β is between 0 and 89°.

4. A process according to claim 1, wherein the angle α is between 30° and 45°.

5. A process according to claim 1, wherein the jets Ja and Jb are arranged such that the resultant jet Jr has a vertical downward direction.

6. A process according to claim 1, wherein the jets Ja and Jb have a cylindrical, conical or sheet shape.

7. A process according to claim 6, wherein the jets Ja and Jb are of cylindrical shape.

8. A process according to claim 7, wherein the cross-sectional diameter of the jets Ja and Jb is from 0.01 mm to 100 mm.

9. A process according to claim 1, wherein in the same group of jets Ja or Jb, the flow rates of the jets are identical.

10. A process according to claim 9, wherein the jet(s) Jb has (have) a different flow rate from that of at least one group of jets Ja.

11. A process according to claim 9, wherein the flow rate of the fluids in each of the jets Ja and Jb is from 1 g/h to 10,000 kg/h.

12. A process according to claim 1, wherein the jets Ja are jets of monomer(s) which is (are) pure or in solvent medium and the jet(s) Jb are jets of an initiator system.

13. A process according to claim 1, wherein the jet Jr is used as one of the jets Ja or Jb in order to prepare another micromixture in a step downstream.

14. A process according to claim 1, carried out in a chamber equipped for recovery of the resultant jet Jr, said chamber optionally being subjected to the temperature and pressure conditions required for the micromixing and the polymerization of the monomer or monomers.

15. A process according to claim 14, wherein the pressure prevailing in the chamber is from 0.1 mbar to 3000 bar, and the temperature is from −100° C. to 1500° C.

16. A process according to claim 1, wherein the fluids comprise at least one monomer which is pure or in polar or non-polar solvent medium, and an initiator system.

17. A process according to claim 1, wherein the monomers are acrylic, methacrylic, vinylaromatic, diene or maleimide monomers.

18. A process according to claim 1, wherein the initiator system comprises a monofunctional or difunctional initiator, optionally combined with a ligand.

19. A process according to claim 1, wherein the duration of the polymerization reaction in the jet Jr is at least 0.001 s.

20. A process according to claim 11, wherein the flow rate is 1 kg/h to 1000 kg/h.

21. A process according to claim 14, wherein the pressure is 0.1 to 100 bar and the temperature is −80° C. to +200° C.

22. A process according to claim 1, comprising at least two groups of said at least two jets Ja.

23. A process according to claim 2, comprising at least two groups of said at least two jets Ja.

24. A process according to claim 13, comprising at least two groups of said at least two jets Ja.

25. A process according to claim 3, wherein the angle β is 0° C.

26. A process according to claim 1, wherein the polymerization is anionic.

27. A process according to claim 1, wherein said fluids (1) and (2) are liquids.

* * * * *